INVENTOR.
Paul Kollsman
BY
Howard G. Russell
ATTORNEY

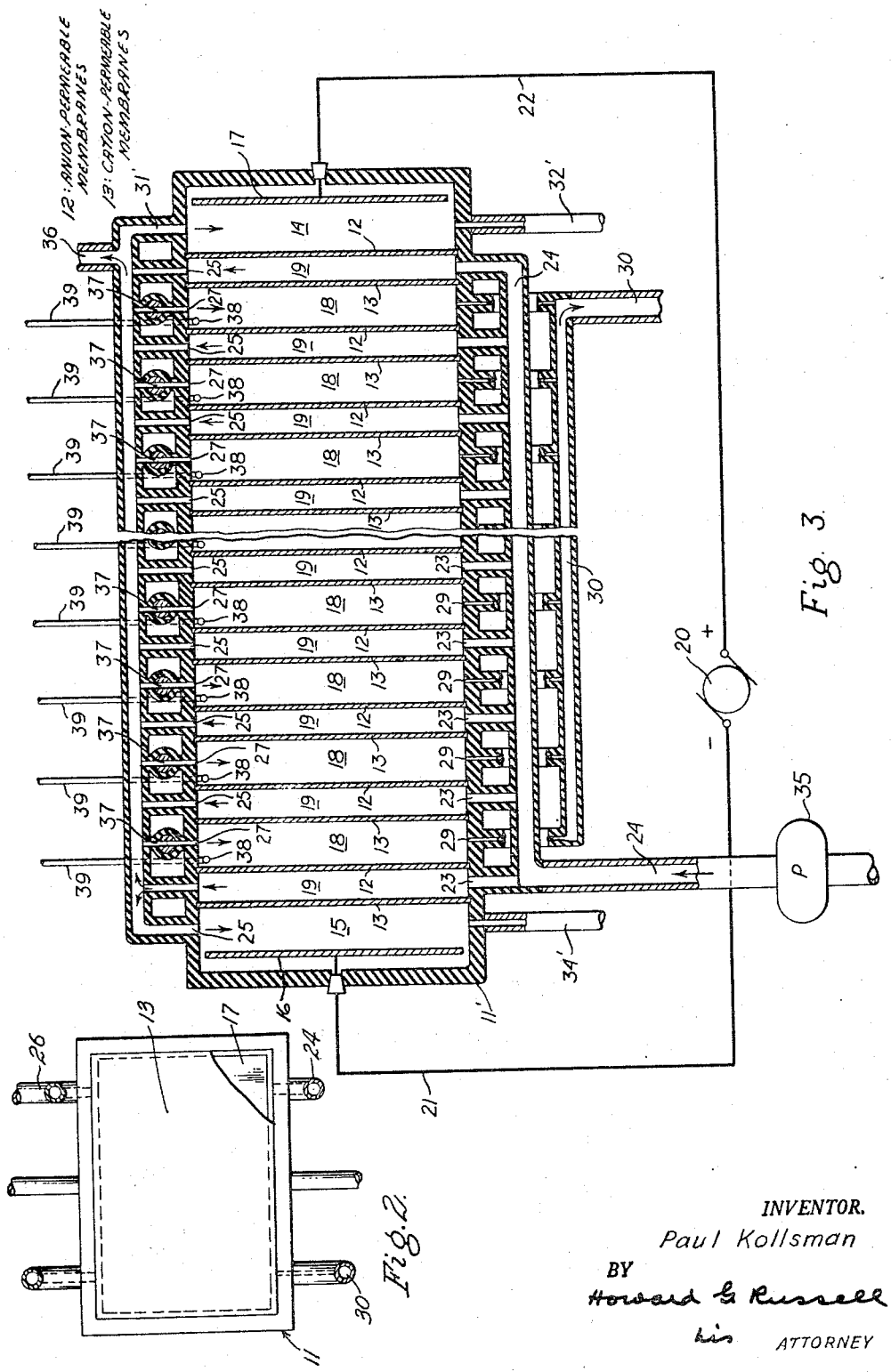

INVENTOR.
Paul Kollsman
BY Howard G. Russell
his ATTORNEY

United States Patent Office 3,296,112
Patented Jan. 3, 1967

3,296,112
METHOD OF MODIFYING THE CHEMICAL COMPOSITION OF SUBSTANCES BY ION TRANSFER
Paul Kollsman, 100 E. 50th St.,
New York, N.Y. 10022
Filed July 16, 1957, Ser. No. 672,311
13 Claims. (Cl. 204—180)

This application is a continuation-in-part of my co-pending application, Serial No. 175,126, filed July 21, 1950, now abandoned.

This invention relates to the art of modifying the chemical composition of substances by a transfer of ions under the influence of an electric current in a process commonly called electrodialysis.

The fundamentals of ion transfer have been known for many years. Briefly, the principle underlying electrodialysis is the fact that compounds in solution, for example, salt in water, split into charged atomic or molecular particles. These charged particles can be forced to move in a controlled fashion under the influence of an impressed electrical potential which may be created between a positively charged anode and a negatively charged cathode. The negatively charged particles tend to travel to the anode and are called anions for this reason and the positively charged particles are attracted by the cathode and are called cations.

Means are also known for selectively influencing, restricting, or impeding the movement of ions which are under the influence of an electric bias. Substances are known which, when formed into a thin wall or membrane, permit anions to pass therethrough while obstructing the passage of cations and other substances are known which permit cations to pass therethrough while blocking the passage of anions. Such membranes are also known as "permselective" or selectively permeable membranes.

It is thus possible to reduce the salt content of saline solutions by causing ions of the salt to pass from one chamber containing the solution through appropriate ion discriminating membranes or wall portions into other chambers, thus removing from the solution the salt it originally contained.

The present invention provides improvements in and refinements of the method of electrodialysis making the method more efficient, resulting in products of higher purity, greater concentration and greater uniformity, than it has heretofore been possible, as far as I am aware.

The present invention and improvements render practical for commercial and economic operation certain basic processes and procedures which heretofore were carried out on a laboratory scale and which were not sufficiently practical for economic commercial operation.

The present invention, among numerous other applications, is admirably suited for the treatment and purification of water to convert raw salt water into fresh water for agricultural and industrial uses, and even for human consumption as drinking water.

However, the invention has broader uses and applications and is particularly suited for the production of certain commercially important and relatively expensive chemical compositions from other compositions which are cheaper and more abundantly available. According to the invention these processes are carried out under influence of an electric current, yet without the presence of electrodes in the chambers in which ionization and de-ionization takes place. In this manner certain undesirable reactions are eliminated which would occur at the electrodes if electrodes were physically present in the ionization and deionization chambers.

By way of example, potassium bromide and hydrogen chloride may be produced from potassium chloride and hydrogen bromide in the presence of water. Other uses and applications of the invention will suggest themselves to persons skilled in the art.

The various objects, features and advantages of this invention will appear more fully from the detailed description which follows, accompanied by drawings, showing, for the purpose of illustration, apparatus for practicing the invention.

The invention also consists in certain new and original combination of steps, as hereinafter set forth and claimed.

Although the characteristic features of this invention which are believed to be novel will be particularly pointed out in the claims appended hereto, the invention itself, its objects and advantages, and the manner in which it may be carried out will be better understood by referring to the following description taken in connection with the accompanying drawings forming a part of it, in which:

FIGURE 2 is an elevational view taken on line 2—2 of FIGURE 1;

FIGURE 3 is a diagrammatic representation of a modified form of apparatus; and

Figure 4:
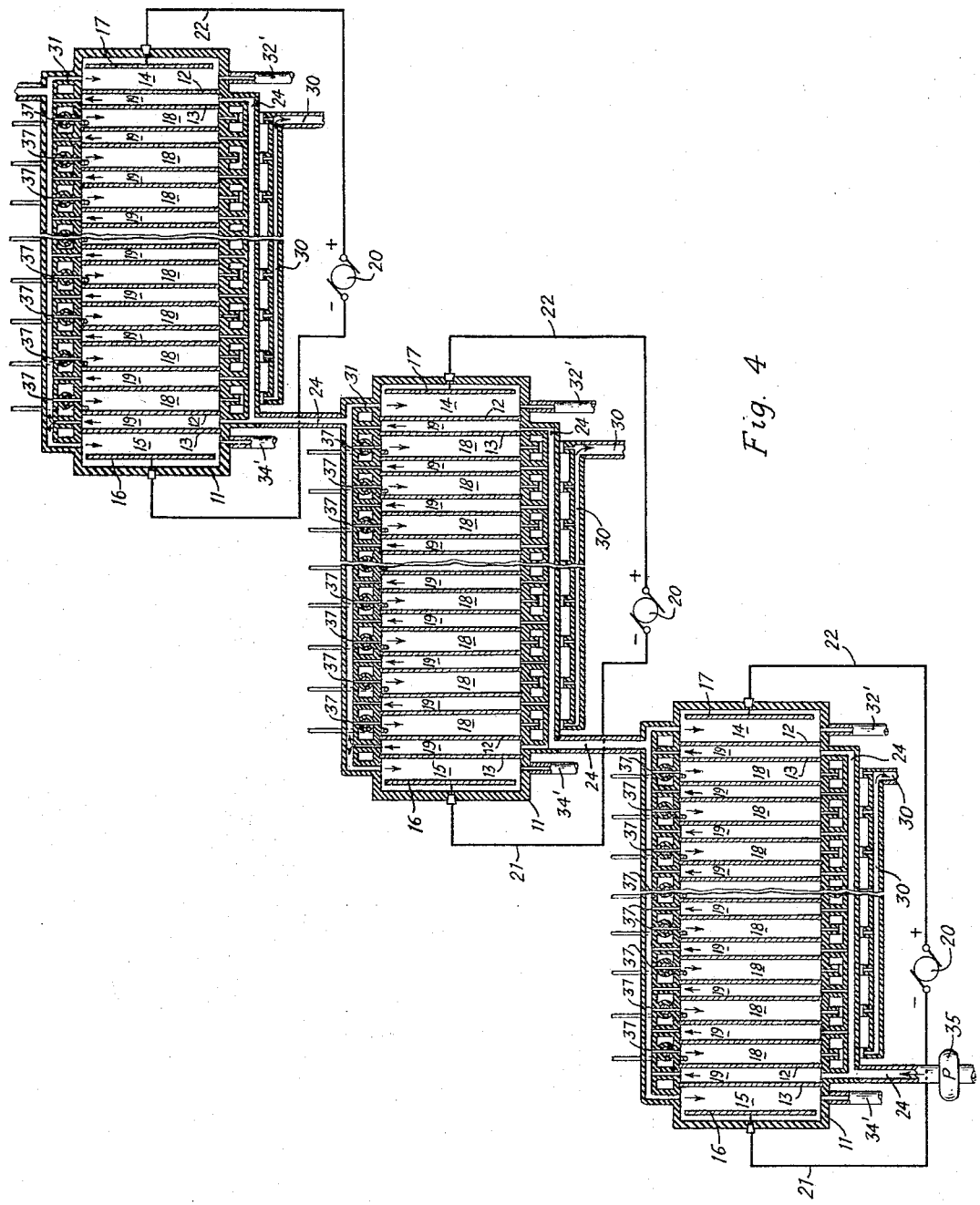

FIGURE 4 diagrammatically illustrates the treatment of fluids in steps or stages.

In the following description and in the claims, various details will be identified by specific names for convenience. Like reference characters refer to like parts in the several figures of the drawings.

In the drawings accompanying and forming a part of this specification, certain specific disclosure of the invention is made for the purpose of explanation of broader aspects of the invention, but it is understood that the details may be modified in various respects without departure from the principles of the invention and that the invention may be applied to, and practiced by, other structures than the ones shown.

Figure 1:
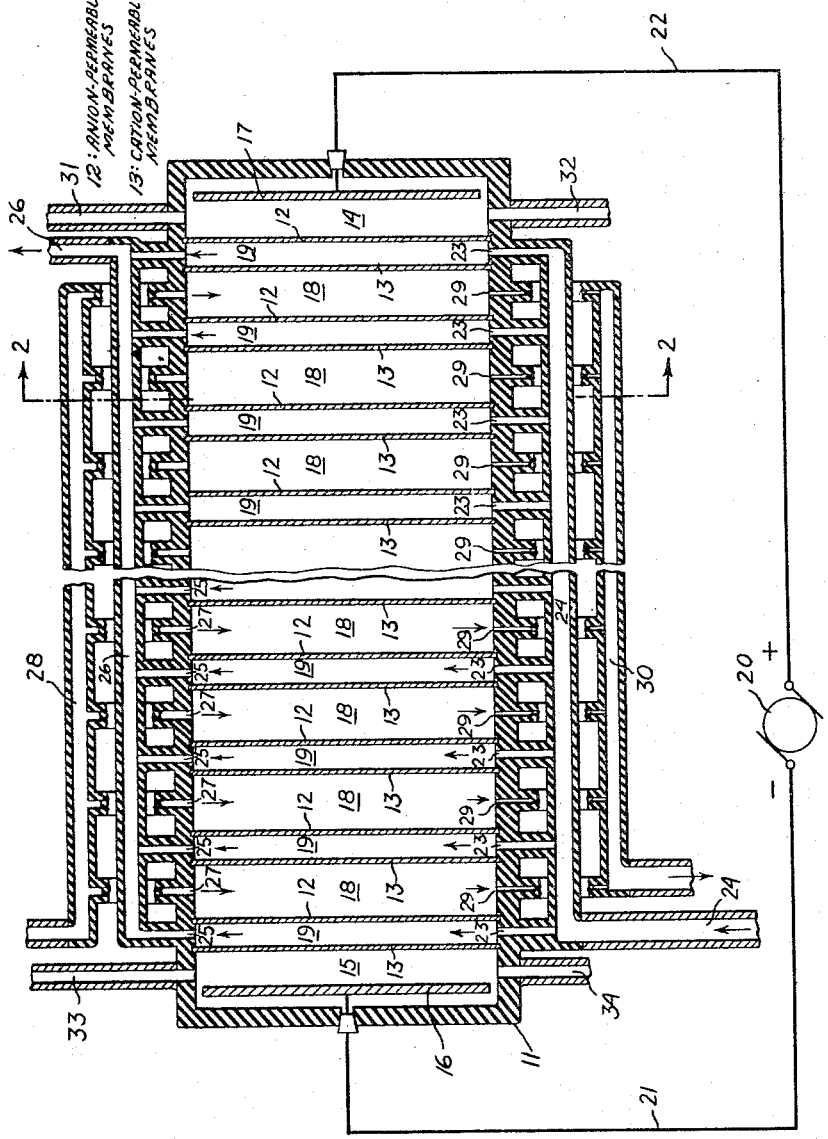
FIGURE 1 is a diagrammatic representation, in vertical cross-section, of an improved apparatus embodying the present invention and adapted to carry out the improved method disclosed herein.

The principles and features of the invention are readily understood by first considering the basic structure of an apparatus for practicing it. FIGURE 1 is a diagrammatic illustration of an apparatus particularly designed for increasing and decreasing the salinity of water by electrodialysis, but it may be used for the treatment or production of other fluids and compositions.

A tank 11 is subdivided into a plurality of chambers or cells by separating ion discriminating walls or diaphragms composed of a suitable composition or material imparting to the walls or diaphragms ion discriminating characteristics. Thus, certain diaphragms 12 are anion-permeable and cation-repellent, while other diaphragms 13 have the opposite characteristics of being cation-permeable and anion-repellent. The diaphragms are arranged in alternating sequence with respect to traverse of the tank from one end to the other so that a anion-permeable diaphragm follows a cation-permeable diaphragm and is, in turn, followed by an anion-permeable diaphragm and so forth.

The chambers or cells may be classified as two terminal cells 14 and 15 containing electrodes 16 and 17, and a plurality of intermediate treatment cells 18 and 19.

The electrode 16 is connected to the negative pole of a source of electric energy 20 by a lead 21 thus becoming a cathode, and the electrode 17 is connected to the positive pole of a source 20 by a lead 22 making the electrode 17 an anode. The intermediate cells 18 may conveniently be termed concentration cells, and the intermediate cells 19 may be called dilution cells, according to the character of the electrodialytic action taking place therein.

The dilution cells 19 are preferably narrower than concentration cells 18, width being measured between the bordering diaphragms.

Speaking first of the dilution cells 19, the cells have inlet ports 23 at, or near, the bottom admitting fluid into the dilution cells from an inlet duct 24 which is suitably manifolded with respect to all the dilution cells.

An outlet port 25 is provided at, or near, the top of each dilution cell and leads to an outlet duct 26.

The concentration cells 18 have a supply port 27 at, or near, the top manifolded with respect to a supply duct 28, and a restricted discharge port 29 provides for the withdrawal of fluid from a point near the bottom of the concentration cells into a discharge duct 30. The supply duct 28 supplies fluid into which ions are to be transferred.

Separate ducts 31, 32, 33 and 34 are preferably provided for the terminal cells 14 and 15 for the supply of fluid to the terminal chambers and the withdrawal therefrom. The fluid of the terminal chambers is preferably handled separately because of certain electrochemical reactions which may be induced by the physical presence of the electrodes in these chambers, making it generally undesirable to mix the product of the terminal cells with the products of the dilution cells or of the concentration cells.

In certain instances it may even be advisable to provide for separate handling of the fluid leaving the cells immediately adjacent the terminal cells by providing separate outlet and discharge facilities for them.

From the arrangement of the ports and ducts it is evident that the direction of flow through the dilution cells is upwards, or opposed to gravitation, while the direction of flow through the concentration cells is opposed to the flow through the dilution cells and is downward, following gravity.

The supply of fluid through the inlet duct 24 is such that the fluid passes through the dilution cells at a predetermined controlled slow rate which is so maintained as to insure a predetermined degree of dilution, by reason of ion depletion, to take place within the cells.

The supply, and particularly the discharge or withdrawal of fluid from the concentration cells is preferably maintained at a fraction of the total volumetric flow passing through the dilution cells, a preferred range of ratios being that in which the flow through the concentration cells is restricted to between one-half and one-twelfth the volumetric flow passing through the dilution cells. This is preferably accomplished by installation of flow restrictions which may be restricted capillary passages 29, as illustrated.

Since most electrodialytic processes involve a transfer of liquid through the diaphragms, it is convenient to compare the volumetric flows through the dilution and the concentration cells by reference to the volume entering the dilution cells and the volume leaving the concentration cells. Thus the volume of the fluid entering the dilution cells includes that portion of fluid which permeates the diaphragms of the dilution cells, and the volume withdrawn from the concentration cells includes the fluid gain by reason of passage of fluid into the concentration cells through its diaphragms.

The operation of the apparatus may be conveniently explained by a specific example. It may be assumed that the apparatus is being used for the production of desalted water and the simultaneous production of concentrated sea water or brine.

When the operation of the device in connection with water purification is understood, it will easily be seen how other compounds in solution may be treated in the apparatus.

It may be assumed that an electrical potential is applied to the electrodes at the time salt-containing raw water enters through the inlet duct 24. The raw water was preferably filtered to free it from mechanical impurities, and is substantially evenly distributed over the great number of dilution cells 19 through which it slowly flows in the direction opposed to gravity.

Assuming, for reasons of simplicity, that the only salt present in the raw water is sodium chloride, the positively charged sodium cations are attracted by the cathode 16 and tend to travel towards it. The sodium cations pass through the cation-permeable diaphragms 13 and accumulate in the concentration cells 18 which they are unable to leave because of the cation-blocking properties of the diaphragms 12 which bar their path.

Similarly, the chlorine anions pass through the anion-permeable diaphragms 12 and accumulate in the concentration cells 18 from which their exit is barred by the anion blocking properties of the diaphragms 13.

The sodium and chlorine ions in the concentration cells recombine as sodium chloride and cause the salt concentration in the cells 18 to increase, while simultaneously the salt concentration in the dilution cell 19 decreases.

Since purified water supplied through duct 28 is present at the top of the concentration cells 18, the purification of water flowing through the dilution cells may be carried to a high degree, and water leaving through the outlet ports 25 has a particularly high degree of purity.

The flow through the concentration cells takes place at a volumetric rate which is only a fraction of the volumetric rate of flow through the dilution cells. For this reason the salt enrichment per volumetric unit of fluid in the concentration cells reaches a higher degree than the salt depletion in the dilution cells. Assuming, for example, that the volumetric flow through the concentration cells is one-sixth of the volumetric flow through the dilution cells, it is evident that the concentration taking place in the concentration compartment is six times as great per volumetric unit of fluid as the loss of salt in the dilution cells so that the water leaving the concentration compartment through the discharge ports contains six times the amount of salt as the sea water entering the dilution cells.

The aforementioned flow and concentration ratios involve several economic advantages. Firstly, it seems that the transfer of fluid, or, in other words, the loss of water by passage from the dilution compartments into the concentration compartments at any particular point of the diaphragm is, in approximation, inversely proportional to the concentration on the other side of the diaphragm at the point where the loss occurs. Since, furthermore, the loss of fluid appears to be proportional to the transfer of ions, the presence of a higher ion concentration near the bottom of the concentration cells lessens the loss of fluid from the dilution cells in which the greatest loss also tends to occur near the bottom. Thus the high ion concentration in the concentration cells tends to reduce the loss of fluid from the dilution cells.

The high concentration of the fluid leaving the concentration cells makes the fluid suitable for further commercial use, which it might not have, if the concentration were less. Thus the resultant brine may be used for manufacture of dry salt and other uses.

In addition, greater economy is achieved due to the fact that the fluid in the cells 18 offers little resistance to electric current because of the high concentration by reason of the reduced volumetric rate of flow.

It is easily seen that the ion depletion in the dilution cells per inch of advance from the inlet ports 23 to the outlet ports 25 proceeds at a slower linear rate than the ion enrichment per inch of advance from the supply ports 27 to the discharge ports 29.

The volumetric rate of flow through thee dilution cells 19 may be controlled either by control of the fluid pressure or by the dimensions of the ports 23, or both, in such a way that the fluid leaving the device through the outlet duct 26 has the desired degree of dilution, and the volumetric flow through the concentration compartment is so controlled, as to maintain the ion enrichment at a predetermined ratio with respect to the ion depletion in the adjoining cells. For example, the ratio may be one to six or one to ten, or any other figure, as conditions may require. This is conveniently effected by control of the outflow, for example, by installation of suitably restricted discharge ports 29.

A particular feature of the counterflow arrangement of the illustrated apparatus is its favorable effect on the current density and distribution. It is evidently desirable to have the greatest current density near the bottom of the cells in order to remove the greatest possible number of ions per unit of time from the flow entering the dilution cells. A high current density near the bottom of the cells is promoted by the concentration cells in which the greatest concentration and hence, the greatest conductivity is likewise near the bottom, and not near the top as it would be in an installation which does not employ the principle of opposite flow on opposite sides of the diaphragms.

Fluid may enter and leave the terminal compartments in any desired direction. The ducts 31 to 33 may be inflow ducts and the ducts 32 and 34 may be discharge ducts, in which event the flow through the terminal cells would also be opposed to the direction of flow in the dilution cells adjoining them. Nevertheless, the flow through the terminal cells may be reversed, if this should be desirable.

A modified form of apparatus is shown in FIGURE 3. The tank 11' with its cells, diaphragms, and electrodes corresponds to the apparatus shown in FIGURE 1 and corresponding reference numerals are applied to corresponding parts. A pump 35 is shown in the inlet duct 24 for feeding fluid into the dilution cells 19 through inlet ports 23.

Concentrate leaves the concentration cells 18 through reduced discharge ports 29 at a controlled reduced rate, and the discharge duct 30 is manifolded with respect to the discharge ports 29.

Ion-depleted fluid leaves the dilution cells 19 through outlet ports 25 and flows into an outlet duct 36 to which the supply ports 27 of the concentration cells are also manifolded. Valves 37 may be provided in the passage between the outer duct 36 and the concentration cells 18. Provision may be made to prevent accumulation of gas in the cells. This is indicated by vent ports 38 leading to vent ducts 39.

In the position in which the valves are shown fluid enters the concentration cells 18 from the outlet duct 36. In the treatment of water this will be purified water, the product of the dilution cells 19. The volumetric flow diverted from the output of the dilution cells 19 for use in the concentration cells is small, and is only a fraction of the volume of purified water produced, the volume being controlled by the restricted flow of concentrate through the restricted discharge ports 29 into the discharge duct 30. The supply of deionized fluid into the concentration cells may be reduced or entirely interrupted by closing the valves 37, so that therafter the flow of concentrate leaving the concentration cell is equal to the passage of fluid through the membranes, the withdrawn concentrate being replenished solely by the fluid passing through the diaphragms incidental to the ion exchange.

The terminal cells 14 and 15 may also be supplied with fluid from the outlet duct 36 or, if required, from any other source. In the illustrated form of apparatus ducts 31' and 33' connect the terminal chambers with the outlet duct 36 and the discharge from the terminal chambers takes place through the ducts 32' and 34'.

It will be noted that, aside from the transfer of ions through the diaphragms, no electrochemical reaction takes place in any of the intermediate cells, since the cells do not contain electrodes.

Considering now the changes taking place in the terminal cells 14 and 15, it is apparent that in the treatment of sea water, sodium ions migrate through the diaphragms 13 thereby depleting the cell 15 of sodium ions. There remains an unbalanced surplus of chlorine in the cell which may be discharged from the chamber, either as a gas or in solution through the separate ducts 32 or 32', 34 or 34', respectively (FIGURES 1 and 3), or through the duct 33 (FIGURE 1), if the direction of flow is reversed.

Similarly, chlorine anions migrate from the terminal cell 14 through the diaphragm 12 and leave an unbalanced sodium surplus in the cell which causes formation of sodium hydroxide and hydrogen, unless other reactions are caused to take place by addition of other chemicals to the fluid entering the chamber 14.

The electrodes 16 and 17 are made of material resisting decomposition. For the treatment of water, carbon, or graphite, may be used as a material for the anode and iron or nickel-chromium may serve as the cathode.

Since the dilution cells represent a greater ohmic resistance per unit of width than the concentration cells because of the lower average concentration of the fluid, the dilution cells may be made narrower than the concentration cells.

In actual practice the thickness of the fluid films in the cells is considerably less than shown in the drawings in which many dimensions are exaggerated for the sake of clearness. It has been found particularly advantageous to make the spaces between the diaphragms less than the thickness of the diaphragms, if highly conductive diaphragms are employed. For example, a spacing of 1 and 2 millimeters has been found advantageous for diaphragms of 3 millimeter thickness.

In the practice of the improved method of electrodialysis flows of fluid to be deionized are confined between flows of fluid into which ions are to be transferred through ion-discriminating diaphragms. The fluids are maintained in the state of flux in opposite directions past the diaphragms and the volumetric flow of the fluid into which ions are to be transferred is preferably maintained smaller than the volumetric flow of the fluid to be deionized. By this arrangement the concentration on both sides of the diaphragm is greatest near the bottom of the cells and the fluid transfer through the diaphragms is minimized as hereinbefore set forth.

The volume of fluid withdrawn from the concentration cells may be supplied in part from the output of the dilution cells, but may be replenished entirely by fluid transfer through the diaphragms. It is evident that in the treatment of fluids in steps or stages as diagrammatically illustrated in FIGURE 4 by passage, in succession, through several ion exchange units 11 and 11' as represented by FIGURES 1 and 3, the fluid supplied to the concentration cells C in the first stage or unit need not be as highly purified as in the succeeding stages, since the purity of the fluid at the top of the concentration cells need not be greater than the desired purity of the fluid leaving the dilution cells D.

Referring to the illustrated forms of apparatus, it is seen that the flow of fluid to be deionized is split into a plurality of substantially equal branches all of which are subjected to the same current. It follows that the rate of deionization per inch of flow is the same in all the branches, assuming that the flows are equal. This is conveniently controlled by proper adjustment of the individual ports through which the fluid enters or leaves the cells.

In order to demonstrate the effectiveness of the method disclosed herein two forms of countercurrent flow, corresponding to FIGURES 1 and 3, were examined and compared with concurrent flow.

For this purpose a 13-chamber apparatus was constructed containing 6 anion membranes and 6 cation membranes arranged in alternating sequence dividing the apparatus into 11 intermediate treatment chambers and 2 terminal electrode chambers. Five of the treatment chambers were dilution chambers corresponding to chambers 19 of the figures and six chambers were concentrating chambers corresponding to chambers 18 of the figures.

The membranes measured 90 mm. x 190 mm. and were spaced apart by neutral spacers of 1/16 inch thickness cut out to provide a zigzag passage for the liquid past the membranes.

The membranes were prepared according to the directions by Meyer and Straus in Helvetica Chimica Acta, vol. 23, pp. 795 to 800 (1940). The anion membranes were prepared by treating collagen sheet material, available to the trade under the name "Naturin," as directed by Meyer and Straus. The Naturin material was obtained from Naturin-Werk, Becker & Co., Weinheim, Germany, successors to C. Freudenberg of Weinheim, Germany. The process of manufacturing Naturin sheet material is disclosed in United States Patent 2,114,220 of April 12, 1938 issued to Freudenberg and Becker of Weinheim, Germany.

The Naturin was treated by methylation as directed by Meyer and Straus and produced anion membranes duplicating the performance reported in the aforementioned article.

In order to test the performance of the membranes dialysis potential measurements were taken after subjecting the membrane to KCl solutions of 0.02 concentration on one side and 0.01 concentration on the other side, producing a potential of −13 mv.

Cation membranes were produced by dyeing cellophane sheet material of 0.1 mm. thickness with Chloranthin-Lichtbraun BRLL as directed by Meyer and Straus. The cation membranes thus prepared were subjected to a dialysis potential test, which produced a reading of +11 mv. for KCl solutions of 0.02 concentration on one side and 0.01 concentration on the other side, as also reported by Meyer and Straus.

For the purpose of the method test, brackish water was synthesized by dissolving 40 g. of NaCl in 5 gallons of spring water. The pH of the brackish water was then adjusted to 4.3 by addition of 8 g. of hydrochloric acid of commercial concentration.

An electrolytic resistivity measurement was conducted to determine the ionic concentration of the water. For this purpose a conductivity cell was used having a cell constant of 0.5. The spring water gave a resistivity reading of 4400 and the synthetic brackish water gave a resistivity reading of 100. Considering the cell constant 0.5 these figures must be doubled to obtain actual resistivity in ohms.

Test I—Concurrent flow

A direct voltage was applied to the platinum electrodes of the apparatus and was adjusted to maintain a current of as close to 140 mA. as feasible. This required a variation in the voltage between 4.6 and 4.8 volts. The outflow of dilute was adjusted to 7.5 cc. per minute and the concentrate outflow was adjusted to produce 5.5 cc. in three minutes, i.e., slightly less than 2 cc. per minute. The apparatus was placed in horizontal position for convenience in connecting plastic tubing to the inflow and outflow ducts.

After approximately 20 minutes of operation the apparatus settled down to a stable condition and its operation was continued for an additional 20 minute period during which the following results were observed:

Resistivity reading of the dilute—175.
Resistivity reading of the concentrate—45.

Test II—Counterflow (FIGURE 1)

For the purpose of this test the direction of the dilute flow was reversed. The flow rates were again maintained at 7.5 cc. per minute for the dilute and 5 cc. in three minutes for the concentrate. An average current of 140 mA. was maintained at a voltage of 4.6.

After an initial running-in period to attain stable conditions the test was carried on for 20 minutes producing the following resistivity readings:

For the dilute: An average of 175 with variations between 174 and 176.
For the concentrate: 45.

Test III—Counterflow with reflux (FIGURE 3)

For the purpose of this test a portion of the dilute was branched off and fed back into the concentration compartments which were thus supplied with dilute liquid of a resistivity of 200 instead of the raw liquid of a resistivity reading of 100. This arrangement left a net production of dilute of 6 cc. per minute. The current was maintained at 140 mA. requiring variation in the voltage between 6.4 and 6.7 volts. The test produced the following resistivity readings:

For the dilute: 200, this being also the reading for the concentrate inflow.
For the concentrate: 38.

In the concurrent flow arrangement of the first test, approximately one-third of the salt was removed from the raw liquid and transferred into the concentrate. The third test resulted in transfer of approximately one-half of the salt of the raw liquid into the concentrate. In the counterflow arrangement of the second test approximately five-twelfths of the salt was transferred into the concentrate.

Evidently the invention may be applied to, and practiced by, various forms of apparatus and is not limited to the specific devices illustrated in the drawings. Likewise, many kinds of chemical compositions may be decomposed, recomposed or transformed by treatment according to the invention.

In this connection ions of compositions may even be replaced by larger electrically charged particles of colloidal size by treatment according to the present method and in the described type of apparatus.

Thus numerous changes, additions, omissions, substitutions and modifications in the appaartus and method steps, as well as other applications of the method may be made without departing from the spirit, the teaching, and the principles of the invention.

What is claimed is:

1. The method of separating a solution containing dissolved electrolyte into concentrated and dilute fractions comprising (1) passing a first stream of solution through one set of chambers of a concentrating and diluting unit having a set of diluting chambers alternately disposed between a set of concentrating chambers, said chambers being defined between alternating anion, permeable and cation permeable membranes, (2) dividing a second stream from the first stream after passage thereof through said unit, (3) passing the second stream through the other set of chambers of said unit and (4) passing a direct electric current in series across the alternating chambers and membranes, thereby to effect concentration and dilution of the streams in said unit.

2. The method of separating a solution containing dissolved electrolyte into concentrated and dilute fractions comprising (1) passing a first stream of solution through the diluting chambers of a concentrating and diluting unit having concentrating chambers and diluting chambers defined between alternate anion permeable and cation permeable membranes, (2) dividing a second stream from the first stream after passage thereof through the unit, (3) passing the second stream through the concentrating chambers of said unit, and (4) passing a direct electric current in series across the alternating chambers and membranes, thereby to effect concentration and dilution of the streams in said unit.

3. The method of deionizing a solution containing dissolved electrolyte, comprising (1) passing a first stream of said solution through the diluting chambers of a concentrating and diluting apparatus having concentrating chambers and diluting chambers alternately disposed between alternate anion permeable and cation permeable membranes, said first stream comprising an upstream portion and a downstream portion within said apparatus; (2) passing a second stream through the concentrating chambers of said apparatus, the second stream being so directed that its downstream portion lies adjacent the upstream portion of the first stream and that its upstream portion lies adjacent the downstream portion of the first stream; and (3) passing direct electric current in series across the alternating chambers and membranes to effect transfer of ions from the upstream portion of the first stream into the downstream portion of the second stream, and from the downstream portion of the first stream into the upstream portion of the second stream, respectively.

4. The method of deionizing a solution containing dissolved electrolyte, comprising (1) passing a first stream of said solution through the diluting chambers of a concentrating and diluting apparatus having concentrating chambers and diluting chambers alternately disposed between alternate anion permeable and cation permeable membranes, said first stream comprising an upstream portion and a downstream portion within said apparatus; (2) dividing a second stream from the first stream after passage thereof through the apparatus; (3) passing the second stream through the concentrating chambers of said apparatus, the second stream being so directed that its downstream portion lies adjacent the upstream portion of the first stream and that its upstream portion lies adjacent the downstream portion of the first stream; and (4) passing direct electric current in series across the alternating chambers and membranes to effect transfer of ions from the upstream portion of the first stream into the downstream portion of the second stream, and from the downstream portion of the first stream into the upstream portion of the second stream, respectively.

5. The method of deionizing a solution containing dissolved electrolyte, comprising, (1) passing a first stream of a certain ionic concentration of said solution through the diluting chambers of a concentrating and diluting apparatus having concentrating chambers alternately disposed between alternate anion permeable and cation permeable membranes, said first stream comprising an upstream portion and a downstream portion within said apparatus; (2) passing a second stream of lower ionic concentration than said certain concentration into and through the concentrating chambers of said apparatus, the second stream being so directed that its downstream portion lies adjacent the upstream portion of the first stream and that its upstream portion lies adjacent the downstream portion of the first stream; and (3) passing direct electric current through the alternating chambers and membranes to effect transfer of ions from the upstream portion of the first stream into the downstream portion of the second stream, and from the downstream portion of the first stream into the upstream portion of the second stream, respectively.

6. The method of deionizing a raw solution containing dissolved electrolyte, comprising (1) arranging anion permeable and cation permeable membranes in alternating order to form fluid confining flow channels therebetween; (2) flowing said raw solution through alternate flow channels; (3) passing ion recipient liquid through other flow channels between said alternate channels so that raw solution flow and recipient liquid alternate in order; (4) applying a direct electric potential across the said membranes, said solution containing channels and said recipient liquid containing channels, the polarity being such as to cause ions to move from said raw solution into said recipient liquid, said solution and liquid flows being so disposed and directed that ions from the upstream portion of the solution flow pass into recipient liquid of a certain ionic concentration and that ions from the downstream portion of said solution flow pass into recipient liquid of less than said certain ionic concentration.

7. In the method of deionizing by direct electric current a raw solution flow containing dissolved electrolyte, the steps of driving by said current ions through permselective membranes from an upstream portion of the solution flow into ion recipient liquid of a certain ionic concentration higher than that of the raw solution; and driving by said current ions through permselective membranes from a portion downstream with respect to said upstream portion into ion recipient liquid of an ionic concentration lower than said certain concentration.

8. In the method of deionizing by direct electric current a raw solution flow containing dissolved electrolyte, the steps of driving by said current ions through permselective membranes first from a certain volume of said solution flow into ion recipient liquid of a certain ionic concentration higher than that of the said certain volume; and then driving by said current ions through permselective membranes from said certain volume into ion recipient liquid of an ionic concentration lower than said certain ionic concentration.

9. In the method of deionizing by direct electric current a raw solution flow containing dissolved electrolyte, the steps of driving by said current ions through permselective membranes from an upstream portion of the solution flow into ion recipient liquid of a certain ionic concentration higher than that of the raw solution; and driving by said current ions through permselective membranes from a portion downstream with respect to said upstream portion into ion recipient liquid of an ionic concentration lower than said certain concentration, but higher than the ionic concentration of the raw solution.

10. In the method of deionizing by direct electric current a raw solution flow containing dissolved electrolyte, the steps of driving by said current ions through permselective membranes from an upstream portion of the solution flow into ion recipient liquid of a certain ionic concentration higher than that of the raw solution; and driving by said current ions through permselective membranes from a portion downstream with respect to said upstream portion into ion recipient liquid of an ionic concentration less than that of the raw solution.

11. In the method of deionizing by direct electric current a raw solution flow containing dissolved electrolyte, the steps of driving by said current ions through permselective membranes from an upstream portion of the solution flow into ion recipient liquid of a certain ionic concentration higher than that of the raw solution; and driving by said current ions through permselective membranes from a portion downstream with respect to said upstream portion into ion recipient liquid deionized to an ionic concentration less than that of the raw solution.

12. In the method of deionizing by direct electric current a raw solution flow containing dissolved electrolyte, the steps of driving by said current ions through permselective membranes from an upstream portion of the solution flow into ion recipient liquid of a certain ionic concentration higher than that of the raw solution; and driving by said current ions through permselective membranes from a portion downstream with respect to said upstream portion into ion recipient liquid derived from said solution flow and having an ionic concentration less than that of the raw solution.

13. In the method of deionizing by direct electric current a raw solution flow containing dissolved electrolyte, the steps of driving by said current ions through permselective membranes from an upstream portion of the solution flow into ion recipient liquid of a certain ionic concentration higher than that of the raw solution; and driving by said current ions through permselective membranes from a portion downstream with respect to said upstream portion into ion recipient liquid derived from said solution flow at a point downstream of said upstream portion.

References Cited by the Examiner
UNITED STATES PATENTS

| | | | |
|---|---|---|---|
| 1,326,104 | 12/1919 | Schwerin | 204—301 |
| 1,868,955 | 7/1932 | Tachikawa | 204—180 |
| 2,140,341 | 12/1938 | Wallach et al. | 204—301 |
| 2,510,262 | 6/1950 | Sollner et al. | 204—180 |

(Other references on following page)

UNITED STATES PATENTS

| | | | |
|---|---|---|---|
| 2,636,851 | 4/1953 | Juda et al. | 204—180 |
| 2,636,852 | 4/1953 | Juda et al. | 204—180 |
| 2,689,826 | 9/1954 | Kollsman | 204—301 |
| 2,835,632 | 5/1958 | Kollsman | 204—180 |
| 2,835,633 | 5/1958 | Kollsman | 204—301 |
| 2,848,403 | 8/1958 | Rosenberg | 204—180 |
| 2,860,095 | 11/1958 | Katz et al. | 204—180 |

FOREIGN PATENTS

| | | |
|---|---|---|
| 694,223 | 7/1953 | Great Britain. |

OTHER REFERENCES

Journal of Phys. and Colloid Chem., vol. 54 (1950), pages 204–226, article by Wyllie et al.

Journal of the Electrochemical Society, vol. 97, No. 7, (July 1950) pp. 139c to 151c, article by Sollner.

Helvetica Chimica Acta, vol. 23 (1940), pp. 795 thru 800, article by Meyer et al.

Nature, vol. 165, April 18, 1950, page 568, article by Kressman.

JOHN H. MACK, *Primary Examiner.*

JOHN R. SPECK, *Examiner.*

R. MIHALEK, J. REBOLD, T. TUNG,
*Assistant Examiners.*